May 10, 1932.     E. MEDINA     1,857,856
METHOD OF MANUFACTURING ORNAMENTAL GLASS TILE
Filed Aug. 6, 1930
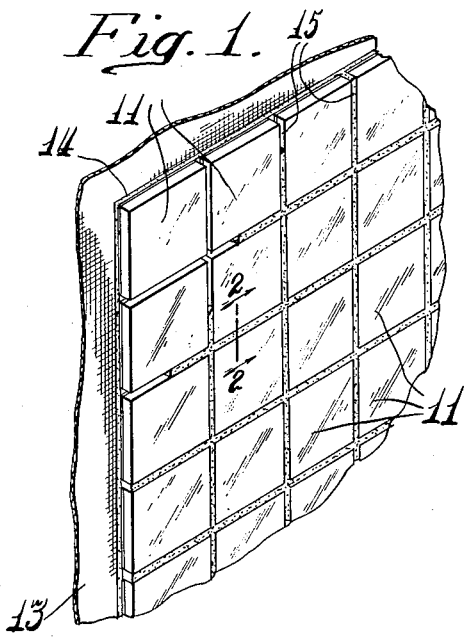
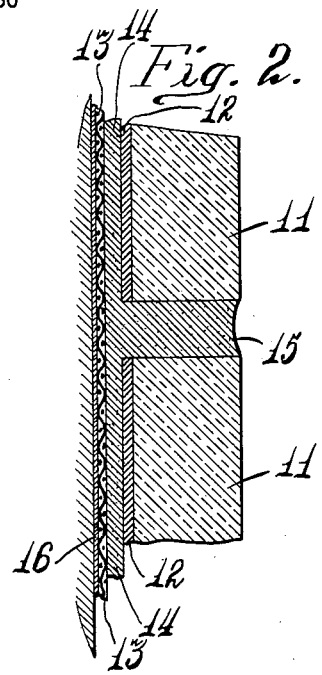
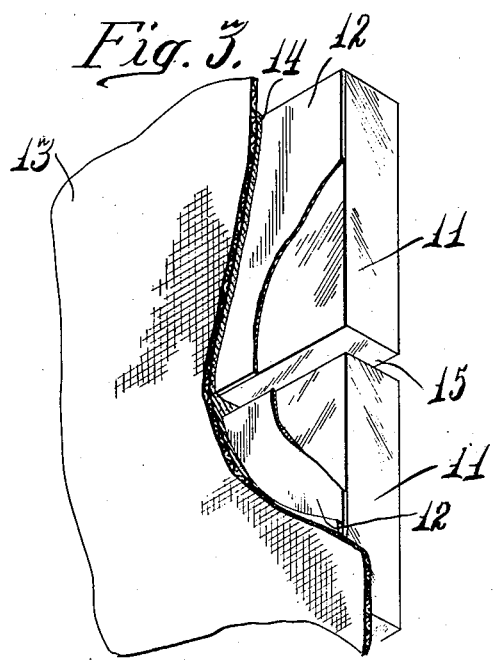
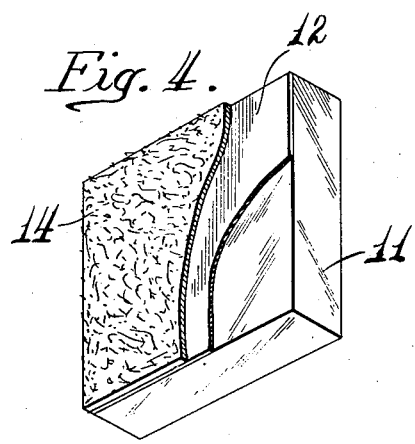
Inventor
Emil Medina
Daniel J Brennan
Attorney Patented May 10, 1932

1,857,856

UNITED STATES PATENT OFFICE

EMIL MEDINA, OF OAK PARK, ILLINOIS

METHOD OF MANUFACTURING ORNAMENTAL GLASS TILE

Application filed August 6, 1930. Serial No. 473,364.

The invention relates to improvements in imitation tile and particularly to an improved means for manufacturing and mounting glass mosaic.

Various means have heretofore been employed to produce a glass mosaic wall-facing capable of retaining its original hue after being applied to a wall. The common types of glass mosaic are mounted in such a manner that their permanent retention has been practically impossible due to the drying out of various lacquers or quick drying varnishes employed as an adhesive.

With the improved means a glass imitation tile is produced which may be employed as a facing or veneer for inside or outside walls, floors or ceilings. The successful application and retention of glass mosaic as a veneer for outside walls has heretofore been impractical with former methods of production and application, as outside walls are subject to varying atmospheric conditions not encountered within a building. Water and dampness penetrate the cement between adjacent glass sections and destroys the color effect of the imitation tile by blemishing the painted surface on the back thereof.

An object of the invention is to provide an improved light weather-proof imitation tile which may readily be applied to old and new walls as special re-enforcing of the walls is not required.

Another object of the invention resides in the process of manufacturing wherein such pigments are applied to one face of a section of transparent material as will adhere to the glass and retain their original hue.

Another object is to provide means whereby the painted surface of the improved imitation tile is not affected by varying weather conditions when applied to exterior surfaces.

Another object is to provide improved means for retaining the improved mosaic in place, said means retaining a limited amount of flexibility without loss of retentivity.

The foregoing and such other objects of the invention as will appear hereinafter as the description proceeds, will be more readily understood from a perusal of the following specifications, reference being had to the accompanying drawings, in which:—

Fig. 1 is a perspective view of a section of the improved wall covering.

Fig. 2 is an enlarged detail sectional view through the improved imitation tile, taken on line 2—2 of Fig. 1.

Fig. 3 is a rear fragmentary perspective view of the improved construction showing portions broken away.

Fig. 4 is a similar perspective view of a modified form of imitation tile.

The invention, in general, resides in the provision of novel sections of transparent material having one surface painted. The paint preferably is applied in such a manner that the completed sections of imitation tile resembles marble or some suitable representation. The glass mosaic, thus formed, preferably is secured to a suitable backing by the application of a specially prepared adhesive to the painted surface. The mosaic is arranged on the backing, or directly upon a wall, with a uniform space being maintained between adjacent mosaic sections which is filled with a plastic substance similar to the adhesive.

As shown in the drawings, the various transparent sections of material 11 are preferably small in size, but if desired larger sections may be provided. Each section of transparent material, which preferably is glass, is cut and ground to the proper size and painted plain or ornamental with an opaque or transparent paint 12 consisting of a mixture of lead paint and oil. This old paint is allowed to dry out thoroughly, said drying requiring about twenty-four hours or more. It is important to the attainment of perfect results that the paint and oils dry out in ordinary atmospheric temperature, as excessive temperatures created by heating or baking causes the paint to lose its original hue, thereby destroying the beauty of the finished product.

After the paint has become thoroughly dry the glass mosaic preferably is set, painted side back, on a sheet of backing material 13 having a thick layer of specially prepared adhesive 14 spread thereover. This backing material preferably is burlap or some similar material having an open mesh; or sheets of paper varying in thickness from heavy wrapping paper to a light cardboard may be employed. When paper is used it must be prepared before hand by oiling and scratching, or it may be perforated, to insure adhesion of the tile thereon and to the surface upon which the mounted imitation tile is placed.

The most desirable adhesive for securing the mosaic sections to the backing consists of a paste-like mixture including white lead, linseed oil, turpentine, sugar of lead, and whiting or plaster of Paris. When the imitation tile is set, the adhesive is allowed to dry out thoroughly in normal temperature, said drying requiring at least forty-eight hours. The spaces 15, between the adjacent sections 11 preferably are left unfilled, to permit rolling of the sheets for delivery. After the sheets of imitation tile are mounted in place, said spaces are filled with the paste-like mixture, or, if desired, pure white lead may be used.

Although it is preferable to arrange the improved imitation tile on suitable backing sheets to facilitate handling and mounting, each tile section may be prepared for individual mounting. To this end a layer of the specially prepared adhesive 14 is applied directly upon the painted side of the sections. While the adhesive is still pliable fibrous material such as waste, sawdust, hair, or the like, is spread thereover and pressed therein.

After drying forty-eight hours or longer, the imitation tile is ready for use, the fibrous material forming a roughened surface or gripping medium for paste 16. The paste used for securing the sections or sheets of imitation tile in place, preferably comprises a thick paint, or a flour paste such as is used for hanging paper may be used.

The improved method of manufacturing and mounting glass imitation tile having the back surface painted is far superior to any previous method. By drying the lead paint backing, before mounting the imitation tile, the usual acids found in paints and oils evaporate. It is the presence of the acid in paint that destroys the color beauty of the finished product. Moisture and dampness cannot injure the mounting surface as the lead backing and filler is moisture proof. The absence of varnish, rosins or quick drying agents insures retention of the imitation tile. Varnishes, rosins, and quick drying agents become very vitreous and any settling of walls covered with a tile employing their use, causes said sections to crack and in many instances fall off. The improved adhesive, including pure white lead, linseed oil, turpentine, sugar of lead, and plaster of Paris, retains a limited amount of flexibility without losing any of its retentivity long after it has become set and hardened.

Although exemplary forms of the invention have been described in the foregoing and shown in the accompanying drawings, it is to be understood that the improved imitation tile and mounting is capable of embodying certain variations without departing from the spirit of the invention or the scope of the appended claims.

I claim:

1. The method of producing an ornamental imitation tile, including the application of paints and oils to one surface of a section of transparent material, applying a layer of pliable substance including white lead, linseed oil and plaster of Paris over said painted surface, and then applying a gripping agent over said pliable substance.

2. The method of producing an ornamental imitation tile, including the application of paint to one surface of a section of transparent material, allowing said paints and oils to dry thoroughly, applying a layer of specially prepared non-vitreous paste over said paint, and then applying a gripping agent over said paste and allowing the whole to dry thoroughly.

3. The method of producing an ornamental imitation tile, including the application of a coating of oil colors on one surface of a section of transparent material, allowing said colors to dry thoroughly, applying a layer of specially prepared adhesive consisting of white lead, linseed oil, turpentine, sugar of lead and plaster of Paris over said paint colors, and then applying a gripping agent on the surface of said adhesive and allowing the whole to dry thoroughly.

4. The process of making glass mosaic, including the application of a layer of paint on one surface of a section of glass, allowing said paint to dry thoroughly, next placing said glass with the painted side down upon a backing having a layer of adhesive thereon, said adhesive consisting of white lead, linseed oil, turpentine, sugar of lead, and plaster of Paris, then allowing the whole to dry thoroughly.

5. The process of making glass mosaic, including the application of oil colors containing no sizing or glue to one surface of a section of transparent material, allowing said colors to dry under normal conditions, the application of an adhesive in paste form over said colors, said adhesive consisting of white lead, linseed oil, turpentine, sugar of lead, and plaster of Paris, placing a backing over said adhesive for joining a plurality of transparent sections together, and allowing the whole to dry thoroughly.

6. The process of making imitation mosaic tile, including the application of paints and oils to one surface of a section of transparent material, allowing said paints and oils to dry, and the application of an adhesive in paste form on said painted surface consisting of white lead, linseeed oil, turpentine, sugar of lead and plaster of Paris.

7. The process of making imitation mosaic tile, including the application of a mixture of paints and oils to one surface of a section of transparent material, allowing said mixture to dry, the application of an adhesive in paste form over said mixture consisting of white lead, linseed oil, turpentine, sugar of lead and plaster of Paris, and the application of a gripping agent over said adhesive before the latter is thoroughly dry.

8. The process of making mosaic wall covering, including the application of oil colors to one surface of a section of transparent material, allowing same to dry thoroughly, applying a plastic substance including white lead, linseed oil, turpentine, and plaster of Paris, over the colors, the application of a gripping agent to said plastic substance and allowing the latter to dry thoroughly, and securing said mosaic covering in place with a thick paint or flour paste.

9. The process of making imitation mosaic tile including the application of a mixture of paints and oils to one surface of a section of transparent material, allowing said mixture to dry, the application of an adhesive in paste form over said mixture consisting of white lead, linseed oil, turpentine, sugar of lead and plaster of Paris, and the application of a backing sheet over said adhesive before the latter is thoroughly dry.

In testimony whereof I affix my signature at 10 So. La Salle St., Chicago, Ill.

EMIL MEDINA.